United States Patent [19]

Bohman

[11] Patent Number: 4,918,441
[45] Date of Patent: Apr. 17, 1990

[54] NON-CONTACT SENSING UNIT FOR ROW CROP HARVESTER GUIDANCE SYSTEM

[75] Inventor: Carl E. Bohman, New Holland, Pa.

[73] Assignee: Ford New Holland, Inc., New Holland, Pa.

[21] Appl. No.: 288,598

[22] Filed: Dec. 22, 1988

[51] Int. Cl.⁴ .............................................. G08G 1/00
[52] U.S. Cl. .................................... 340/901; 180/167; 56/DIG. 15
[58] Field of Search ................ 180/167; 342/438, 988, 342/901; 56/1, 10.2, DIG. 15

[56] References Cited

U.S. PATENT DOCUMENTS

| | | | |
|---|---|---|---|
| 2,818,553 | 12/1957 | Jaffe | 340/901 |
| 3,497,895 | 10/1968 | Hasenbalg | 180/167 |
| 4,383,238 | 5/1983 | Ealdo | 340/901 |

Primary Examiner—Joseph A. Orsino
Assistant Examiner—Frank M. Scutch, III
Attorney, Agent, or Firm—Griffin, Branigan & Butler

[57] ABSTRACT

A non-contact row crop sensor comprises one or more transmitter/receptor pairs mounted on two row separators of a harvesting machine. Each transmitter transmits an energy beam to one of the receptors and the energy beams cross at a point which defines a position of the harvesting machine relative to a row of crop stalks. A circuit produces steering control signals dependent upon the time of intercept of one beam of a pair relative to the time of intercept of the second beam of the pair. A discriminator circuit is provided for discriminating between crop stalks and weeds. Plural transmitter/receptor pairs permit discrimination between intercepts caused by leaves and those caused by stalks.

20 Claims, 4 Drawing Sheets

NON-CONTACT SENSING UNIT FOR ROW CROP HARVESTER GUIDANCE SYSTEM

FIELD OF THE INVENTION

This invention relates to guidance systems and more specifically to automatic or assisted guidance systems particularly suitable for use in guiding combines, self-propelled or pull-type forage harvesters, or any row crop harvesting machine.

BACKGROUND OF THE INVENTION

It is a difficult and taxing task to manually steer a multiple row harvesting machine even when the machine is moving along the rows at a modest rate of speed. The row crop separators which guide the crop to the cutting elements of the machine are often obscured by dust, crop material and/or vegetation such that precise manual steering by visual observation is difficult if not impossible. To alleviate this problem, steering control systems have been developed which employ mechanical feelers to determine the position of a standing row crop relative to the row crop separators. While steering control systems with mechanical feelers offer an improvement over guidance by visual observation, these systems have certain disadvantages in that the mechanical feelers are subject to fouling and damage. In addition, because of the environment in which the feelers must operate, they must be serviced frequently to insure that they are mechanically free.

SUMMARY OF THE INVENTION

An object of the present invention is to provide a guidance system for a row crop harvesting machine, the system employing non-contact sensors for determining the alignment of the machine relative to a standing crop row.

An object of the present invention is to provide a guidance system for a row crop harvesting machine, the system employing energy beam transmitters and receptors for sensing the location of a standing crop row relative to the crop row separators of the harvesting machine.

A further object of the invention is to provide a guidance system for a harvesting machine, the guidance system employing non-contact sensors and including a discriminator circuit for discriminating between weeds and crop stalks.

In one embodiment a transmitter/receptor pair, comprising two energy beam transmitters and two receptors, is mounted on two crop row separators such that the energy beams transmitted by the transmitters intersect midway between the separators. The energy beams are received by the receptors to produce electrical signals. When the harvesting machine is in alignment with the crop row, the crop row is midway between the separators and both energy beams are interrupted at the same time by each crop stalk as the harvesting machine moves along the rows. However, if the crop row is not midway between the separators then one energy beam is interrupted before the other one. The output signals from the receptors are processed to develop steering control signals determined from the time of intercept of the two energy beams. The steering control signals may be applied to a steering control mechanism to automatically control the steering of the harvesting machine, or they may be used to drive "right" and "left" indicators for indicating to the operator the direction in which he should steer.

In a second embodiment multiple transmitter/receptor pairs are provided, each pair producing intersecting energy beams. The transmitter/receptor pairs are arranged that the intersection points of the beams of all pairs lie in a vertical line located midway between two crop row separators. This permits discrimination between beam intercepts caused by crop stalks and those caused by leaves or foliage.

Other objects of the invention and its mode of operation will become apparent upon consideration of the following description and the accompanying drawing.

DESCRIPTION OF PREFERRED EMBODIMENTS

Figure 1:
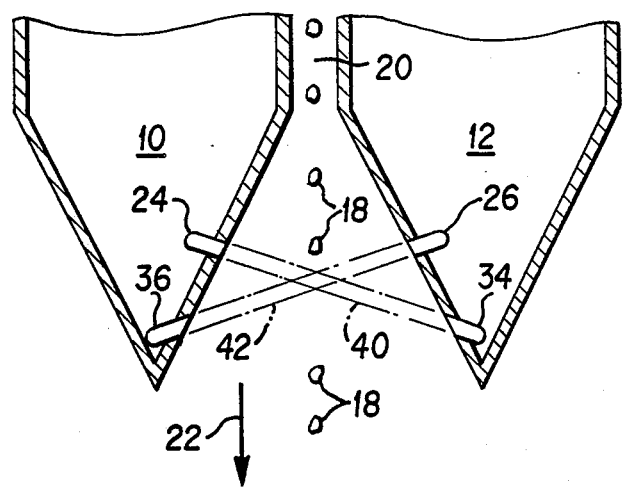
FIG. 1 is a top part-sectional view of a harvesting machine header having two energy beam transmitters and two receptors mounted on adjacent crop row separators.

FIG. 1 is a sectional top view of two crop row separators 10 and 12 forming part of a header for a harvesting machine. Although only two row separators are shown it will be understood that the header may have a plurality of row separators like those shown with the header being mounted in front of a harvesting machine. The row separators 10 and 12 separate adjacent rows of crop material and direct the stalks 18 of one row into a guideway 20 so that it may be cut by the cutting elements of the harvesting machine as the machine moves in the direction of arrow 22.

In accordance with the principles of the present invention two transmitters 24 and 26 and two receptors 34 and 36 are mounted on two adjacent row separators. The row separators 10 and 12 are provided with holes and the transmitters and receptors are mounted on the row separators so that energy beams 40 and 42, transmitted by transmitters 24 and 26, respectively, are received by receptors 34 and 36, respectively. The transmitted energy beams are dimensioned such that they are completely blocked or interrupted by stalks 18 as the harvesting machine moves along the crop row.

The energy beams intersect at a point midway between row separators 10 and 12 hence it is evident from FIG. 1 that if the guideway 20 of the harvesting machine is aligned with the row of stalks 18 then each stalk will interrupt energy beams 40 and 42 at about the same time as the harvesting machine moves in the direction of arrow 22. On the other hand, if the row separators are too far to the right relative to the row of stalks (looking in the direction of arrow 22) then each stalk will interrupt the energy beam 40 before it interrupts the beam 42. In like manner, if the row separators are too far to the left relative to the row then beam 42 will be interrupted by each stalk before the beam 40 is interrupted.

Figure 2:
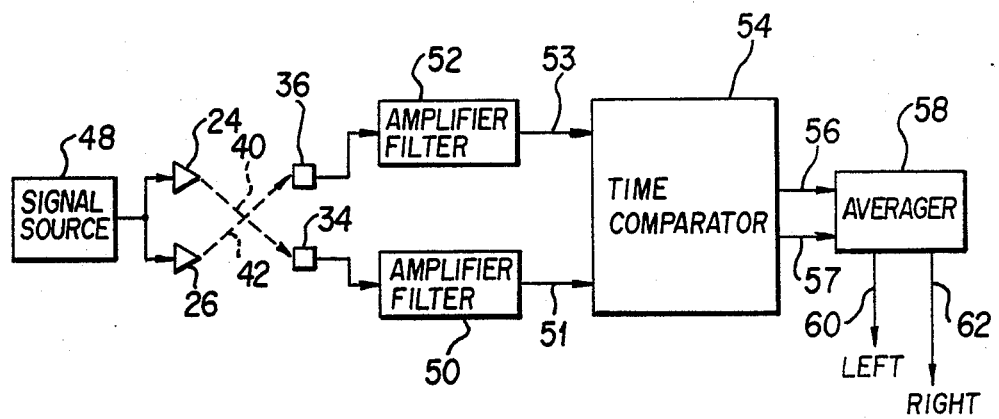
FIG. 2 is a schematic diagram of a circuit for developing steering control signals from two crossed energy beams.

The circuit of FIG. 2 may be utilized to develop steering correction signals in response to interruption of the energy beams 40 and 42. A signal source 48 applies an energizing signal to transmitters 24 and 26 to generate the energy beams 40 and 42. In response to energy beam 40, the receptor 34 produces an output signal which is applied through an amplifier and filter circuit 50 to one input of a time comparator 54. The receptor 36 responds to energy beam 42 and produces an output signal which is applied through an amplifier and filter circuit 52 to a second input of time comparator 54. The time comparator 54 determines the time of occurrence of the signal from amplifier 50 (resulting from interruption of energy beam 40) relative to the time of occurrence of the signal from amplifier 52 (resulting from interruption of the beam 42) and produces one of two steering correction signals 56, 57 depending on which energy beam is interrupted first.

The steering correction signals 56, 57 produced by time comparator 54 are applied to an averager circuit 58 which averages the signals over a number of stalks to obtain a statistical measure of the correction signals. The averager circuit 58 then produces a "left" or "right" steering control signal on lead 60 or 62. A threshold function may be included in the average circuit so that it produces no steering control signal if the harvesting machine is properly aligned with the rows, or if there are minor crop displacements. The steering control signal leads 60 and 62 may be connected to the conventional steering control mechanism for the harvesting machine to automatically control steering or they may be connected to visual indicators to indicate to the operator that he should manually steer to the left or to the right.

Figure 3:
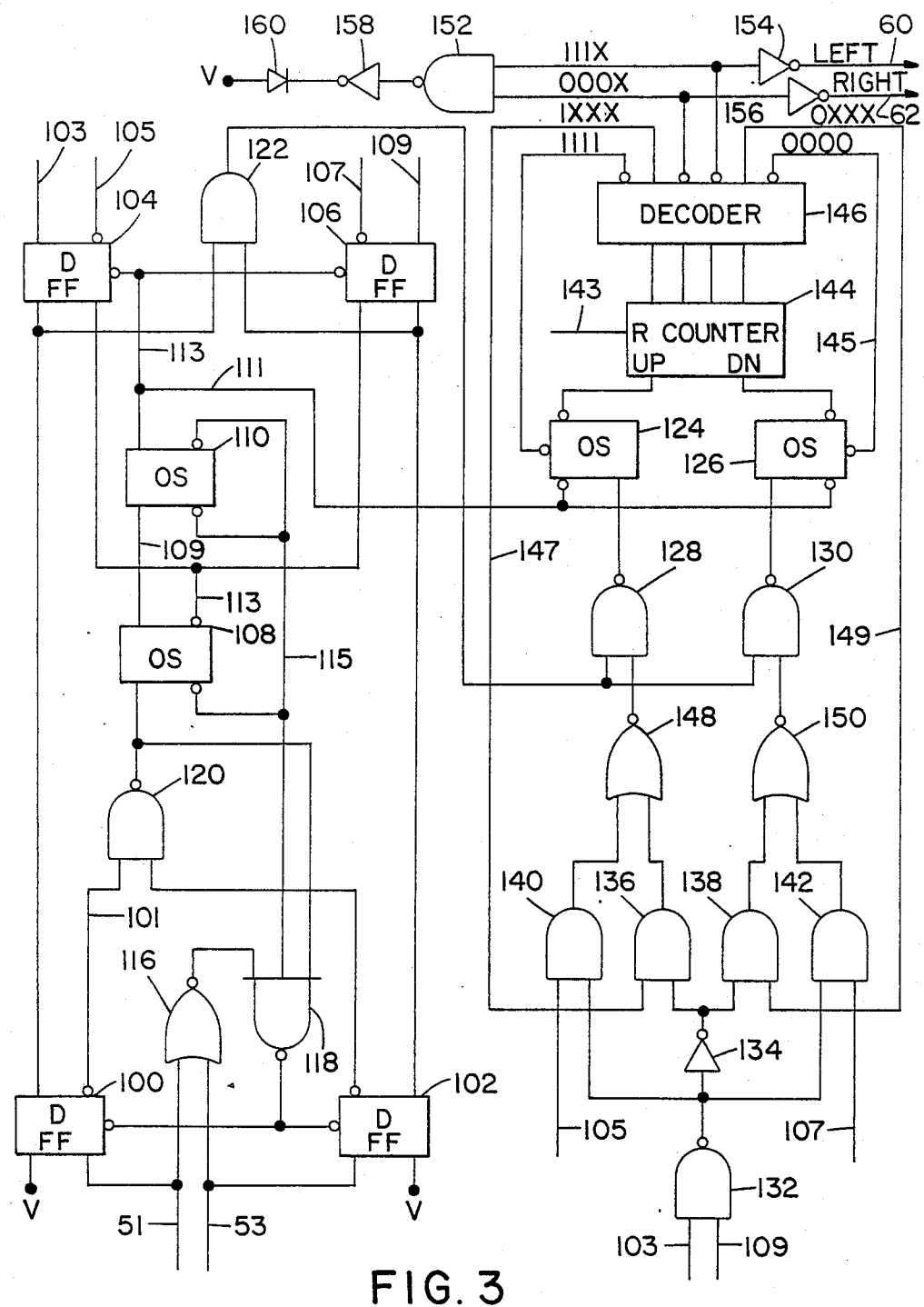
FIG. 3 is a logic diagram of the time comparator and averager circuits of FIG. 2.

FIG. 3 illustrates a logic circuit for performing the functions of time comparator 54 and averager circuit 58. The time comparator circuit includes four D-type flip-flops 100, 102, 104 and 106 and two one shot multivibrators 108 and 110. The outputs of amplifier and filter circuits 50 and 52 are connected by leads 51 and 53 respectively to the clocking inputs of flip-flops 100 and 102, respectively. In addition, leads 51 and 53 are connected to a NOR 116 and the output of the NOR is connected to one input of a NAND 118.

One output of FF 100 is connected to the data input of FF 104 and one input of a AND 122. One output of FF 102 is connected to the data input of FF 106 and a second input of AND 122. The second outputs of FFs 100 and 102 are connected to a NAND 120 whose output is connected to one-shot multivibrator (OS) 108 and NAND 118.

OS 108 has one output connected to trigger one-shot multivibrator (OS) 110 and the second output is connected to the clocking inputs FFs 104 and 106. OS 110 has one output connected to the reset inputs of FFs 104 and 106 and a second output connected to NAND 118 and OSs 108 and 110.

The purpose of OS 108 is to establish a dead zone interval immediately following interruption of one of the beams 40 or 42 by a stalk. If the other beam is interrupted during the dead zone interval then the circuit treats the two interruptions as if the two beams were interrupted simultaneously. The reason for the dead zone interval is to prevent generation of a steering control signal when slightly misaligned stalks cause one beam to be interrupted just slightly before the other one even though the harvesting machine is so closely aligned with the crop row that no steering adjustment is required. At the end of the dead zone interval, when OS 108 resets, the output of OS 108 clocks FFs 104 and 106 to store therein the states of FFs 100 and 102, these states being an indication of which beam or beams have been interrupted. Steering control signals are then generated in accordance with the states of FFs 104 and 106.

Consider the case where beam 40 is interrupted first so that amplifier and filter circuit 50 produces a signal on lead 51. In FIG. 3, this signal clocks and sets FF 100 and passes through NOR 116 to inhibit NAND 118. When FF 100 is set its output on lead 101 inhibits NAND 120. The resulting positive-going output of NAND 120 triggers OS 108 to initiate the dead zone interval. When OS 108 is triggered it produces a positive-going signal on lead 109 which triggers OS 110. When OS 110 is triggered the positive signal on lead 111 enables two one shot multivibrators OS 124 and OS 126 to respond to negative-going triggering pulses from two NANDs 128 and 130, respectively. OS 110 has a timing interval of about 4.7 ms which begins at the same time as the dead zone interval. The dead zone interval which is tolled by OS 108 is typically on the order of 3.7 ms. The interval following the end of the dead zone interval and during which OS 110 is still in the set state, defines a gating interval for controlling the incrementing-/decrementing of a counter 144 as subsequently explained. At the end of the gating interval OS 110 resets. This produces a signal on lead 113 to reset FFs 104 and 106 and a signal on lead 115 which acts through NAND 118 to reset FFs 100 and 102.

Assume that beam 42 is interrupted by a stalk and that this interruption occurs during the dead zone interval after interruption of beam 40. The interruption of beam 40 causes amplifier and filter circuit 52 to produce a signal on lead 53 and in FIG. 3 this signal sets FF 102. With FFs 100 and 102 both set, both inputs to AND 122 are enabled and the output of AND 122 enables two NANDs 128 and 130. At the end of the dead zone interval OS 10B resets and the positive-going signal on lead 113 clocks the set states of FFs 100 and 102 into FFs 104 and 106, respectively.

Output leads 103 and 109 from FFs 104 and 106 are connected to a NAND 132 which is enabled when both FFs are set. The output from NAND 132 is inverted at 134 and enables two NANDs 136 and 138. At the same time, the output of NAND 132 blocks two further NANDs 140 and 142.

On the other hand, if the second energy beam is not interrupted before the end of the dead zone interval then at the end of the interval only one of FFs 104 and 106 will be set. In this case only, NAND is blocked and one input of each of ANDs 140 and is enabled. Thus, depending on whether FF 104 or is set, one of ANDs 140 or 142 will be fully enabled.

To digress for a moment, a four-stage binary up-/down counter 144 is provided which performs the averaging and threshold functions of averager circuit 58. The stages of counter 144 are connected to count in the sequence shown in Table I.

TABLE I

| BINARY COUNT | DECIMAL EQUIVALENT | OUTPUTS FROM DECODER |
|---|---|---|
| 0000 | 0 | steer right |
| 0001 | 1 | steer right |
| 0010 | 2 | light no-steer indicator 160 |
| 0011 | 3 | light no-steer indicator 160 |
| 0100 | 4 | light no-steer indicator 160 |
| 0101 | 5 | light no-steer indicator 160 |
| 0110 | 6 | light no-steer indicator 160 |
| 0111 | 7 | light no-steer indicator 160 |
| 1000 | 8 | light no-steer indicator 160 |
| 1001 | 9 | light no-steer indicator 160 |
| 1010 | 10 | light no-steer indicator 160 |
| 1011 | 11 | light no-steer indicator 160 |
| 1100 | 12 | light no-steer indicator 160 |
| 1101 | 13 | light no-steer indicator 160 |
| 1110 | 14 | steer left |
| 1111 | 15 | steer left |

Counter 144 is initialized or reset to a count of 8 (1000) by a signal on lead 143 when power is turned on or a reset switch (not shown) is depressed. Each negative-going pulse applied to the counter 144 at its UP input increases the count in the counter and each negative-going pulse applied to the DN input decrements the count in the counter. The outputs of the counter are connected to a decoder 146. Decoder 146 produces a signal on lead 145 when the count in the counter is 0000. This signal is applied to the inhibit input of OS 126 and prevents OS 126 from producing output pulses to decrement the counter. This prevents counter wrap-around from 0 to 15. In like manner decoder 146 produces a signal on lead 147 which is connected to the inhibit input of OS 124 to prevent OS 124 from producing an output pulse which would increment the counter from 15 to 0.

When counter 144 contains a count of 14 or 15 the decoder 146 produces the signal 111X which is applied to a NAND 152 and an inverter 154. When the counter contains a count of 0 or 1 the decoder produces the signal 000X which is applied to NAND 152 and an inverter 156. The outputs of inverters 154 and 156 are the "left" and "right" steering control signals on leads 60 and 62, respectively.

When counter 144 contains a count from 2 to 13, both inputs to NAND 152 are false (high) and the NAND produces an output through an inverter 158 to energize a visual indicator 160 to indicate that the harvesting machine is properly aligned with the crop row.

When counter 144 contains a count of from 8 to 15 decoder 146 produces an output signal on lead 147 to enable one input of AND 136 and when the counter contains a count of from 0 to 7 decoder 146 produces an output signal on lead 149 to enable one input of AND 138.

Counter 144 may or may not be incremented or decremented at the end of the dead zone interval depending on which of the energy beams 40 and 42 have been interrupted, and the count on the counter.

Assume that both energy beams are interrupted before the end of the dead zone interval established by OS 108. As soon as the second beam is interrupted to set FF 100 or 102, the output of AND 122 enables NANDs 128 and 130. Prior to the end of the dead zone interval the FFs 104 and 106 will both be in the reset state hence the output of NAND 132 enables ANDs 140 and 142 while the output of inverter 134 blocks ANDs 136 and 138. The outputs 105 and 107 from FFs 104 and 106 enable ANDs 140 and 142 and they produce output signals which pass through NORs 148 and 150 to block NANDs 128 and 130.

At the end of the dead zone interval FFs 104 and 106 are both set so that NAND 132 blocks ANDs 140 and 142 while the output of inverter 134 enables ANDs 136 and 138. If the count in counter 144 is between 0 and 7 the signal on lead 149 enables AND 138 and the output of NOR 150 continues to block NAND 130 so that OS 126 does not decrement the counter. At the same time, the signal on lead 147 blocks AND 136 and the AND produces an output signal which passes through NOR 148 and NAND 128 to trigger OS 124. The output from OS 124 increments the count in counter 144.

If the count in counter 144 is between 8 and 15, and both energy beams are interrupted before the end of the dead zone interval then, at the end of the dead zone interval AND 136 will be enabled and AND 138 will be blocked by the signal on lead 149. The output of AND 136 acts through NOR 148 to block NAND 128 thereby preventing the triggering of OS 124. At the same time, with AND 138 blocked, the output of NOR 150 enables NAND 130 and the negative-going output of NAND 130 triggers OS 126 whose output decrements the count in counter 144.

To summarize, if both energy beams are interrupted before the end of the dead zone interval, the count in the counter is incremented if the count is less than 8 but decremented if the count is greater than 7. Thus, as long as the harvesting machine is aligned with the crop row the counter will reduce any misalignment count accumulated in the counter. That is, it averages the number of input signals 51, 53.

Assume that only beam 40 is interrupted during the dead zone interval with the other beam being interrupted after the dead zone interval. In this case, only FF 104 is set at the end of the dead zone interval. The output of NAND 132 enables ANDs 140 and 142 while the output of inverter 134 blocks ANDs 136 and 138. With FF 104 set, the signal on lead 105 blocks AND 140. With both ANDs 136 and 140 blocked NOR 148 enables NAND 128 and if the count in the counter is not 1111, the output of the NAND triggers OS 124 to increment the count in counter 144. If the incremented count is 14 or 15 the counter produces the signal 111X which is inverted at 154 to become the "left" steering control signal on lead 60.

If energy beam 42 is interrupted during the dead zone interval with beam 40 being interrupted after the dead zone interval then only FF 106 is set at the end of the dead zone interval. Again, the output of NAND 132 enables ANDs 140 and 142 while the output of inverter 134 blocks ANDs 136 and 138. With FF 104 reset its output signal on lead 105 passes through AND 142 and NOR 148 to block NAND 128 and prevent OS 126 from incrementing counter 144. Since FF 106 is set, the signal it produces on lead 107 blocks AND 142. With AND 138 and 142 blocked, NOR 150 produces an output signal which passes through NAND 130 to trigger OS 126 if the count in counter 144 is not 0000. The output of OS 126 decrements the count in the counter 144 and if the decremented count is 0 or 1 decoder 146 produces the signal 000X which is inverted at 156 to become the "right" steering control signal on lead 62.

If both energy beams are not interrupted before the end of the gating interval, that is, by the time OS 110 resets, then the counter 144 is neither incremented or decremented. Unless both energy beams are broken, the AND 122 remains blocked and the output of AND 122 blocks NANDs 128 and 130 so that no negative-going pulses can be produced to trigger OS 124 or OS 126 to thereby increment or decrement the counter.

The energy beams 40 and 42 may be of practically any type such as, for example, sonic, ultrasonic, visible light, or infrared. The principal advantage of using acoustic beams is their ability to function in the presence of dust and dirt in the region of the sensors and receptors. However, sonic beams have certain disadvantages in that the sound energy may penetrate the standing crop to some extent, and may bend around the crop stalks thus making discrimination of the receptor signal difficult. Ultrasonic beams do not suffer these disadvantages and thus are preferable to sonic beams. Both sonic and ultrasonic beams have the disadvantage that noise generated by the harvesting machine may occasionally cause interference but this disadvantage may be overcome by properly filtering the output signals from the sensors.

A visible light beam has the advantage that it is discernible thus making it easier to trouble shoot problems. However, visible light sensors are subject to interference from sunlight and other external sources. The problem may be overcome by modulating the light beams in which case the signal source 48 will include a suitable modulator. Alternatively, modulated or unmodulated infrared beams may be employed.

Regardless of the type of energy beams employed, the embodiment of FIGS. 1 and 2 may not provide the desired preciseness of control when harvesting crops with leaves low on the stalks. These lower leaves interrupt the energy beams at the stalk, as do the stalks, thus resulting in momentary erroneous guidance control signals Since statistically there should be as many leaves on one side of a row of stalks as there are on the other, beam interruptions by lower leaves should average to zero over a period of time. Additional electronic signal processing might be used to reduce the effect of lower leaves but additional electronic averaging compromises the accuracy and response time of the circuit.

Figure 5:
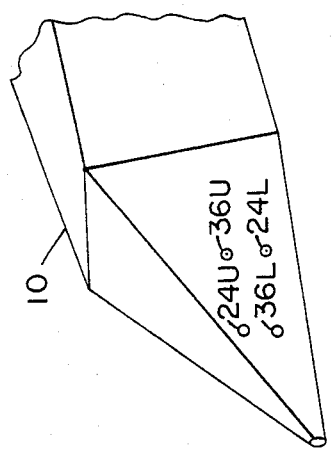
FIG. 5 shows a crop row separator having vertically arranged pairs of energy beam transmitters and receptors.
Figure 4:
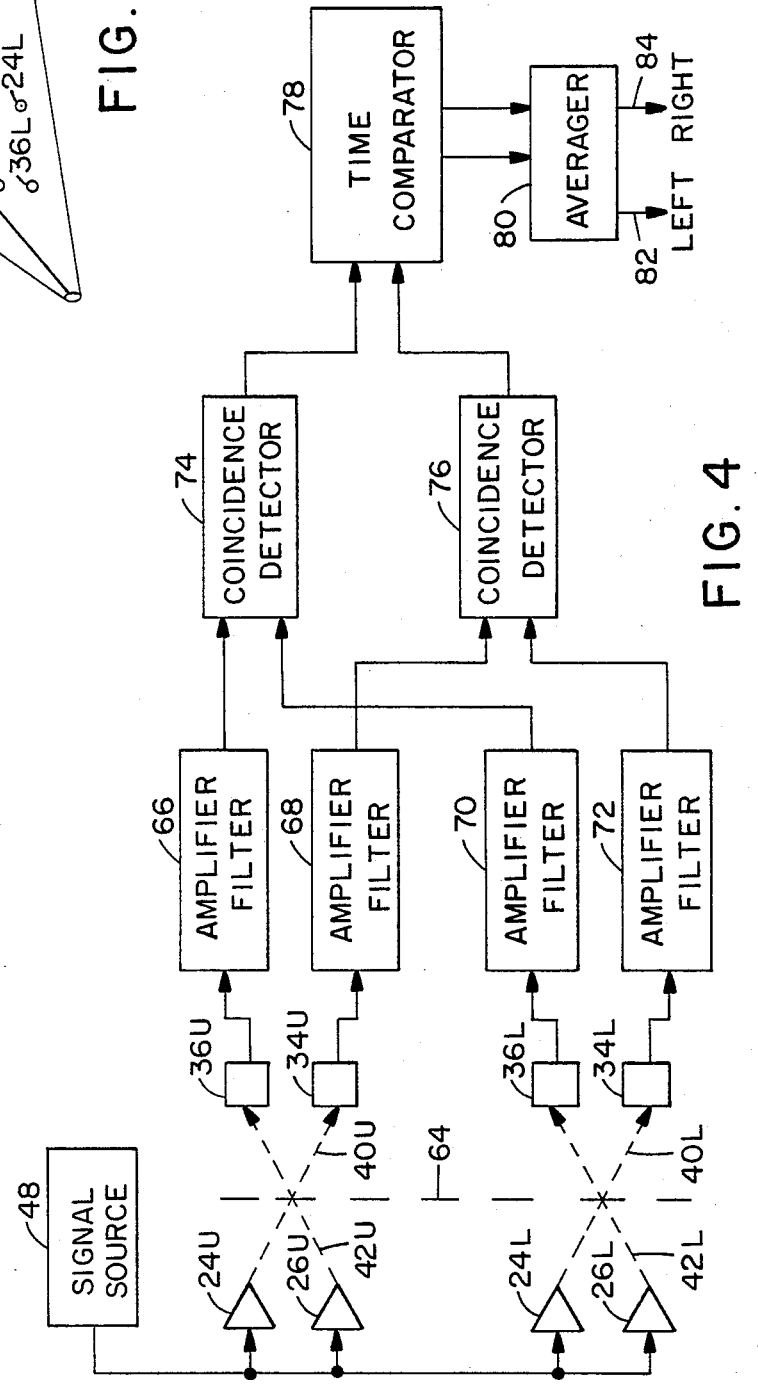
FIG. 4 is a schematic diagram of a circuit for developing steering control signals from vertically arranged pairs of energy beam transmitters and receptors.

FIGS. 4 and 5 illustrate an embodiment of the invention capable of discriminating between leaves and stalks. In most cases the stalks are vertical while the lower leaves are not vertical but slant off from the sides of the stalk at an angle. To discriminate between vertical stalks and slanted leaves two or more transmitter/receptor pairs are provided, each transmitter/receptor pair being arranged to produce intersecting energy beams as illustrated in FIG. 1. FIG. 4 shows a first or upper transmitter/receptor pair comprising transmitters 24U and 26U and receptors 34U and 36U and a second or lower transmitter/receptor pair comprising transmitters 24L and 26L and receptors 34L and 36L. FIG. 5 shows one transmitter and one receptor of each pair on one crop row separator 10. The transmitters and receptors of a pair are positioned on the crop row separators so that the energy beams intersect midway between the dividers. In addition, the points of intersection of the beams of each pair lie on a vertical line 64 which is generally coplanar with the stalks of a row when the harvesting machine is properly aligned with the rows.

The outputs of receptors 36U, 34U, 36L and 4L are connected to amplifier and filter circuits 66, 8, 70 and 72, respectively. The outputs of amplifier and filter circuits 66 and 70 are connected to a first coincidence detector 74 and the outputs of amplifier and filter circuits 68 and 72 are connected as inputs to a second coincidence detector 76.

The circuit of FIG. 4 operates as follows. If the harvesting machine is properly aligned with a row of stalks then each stalk will interrupt light beams 40U, 42U, 0L and 42L substantially simultaneously and all of the amplifier and filter circuits produce an output signal to the coincidence detectors 74 and 76. As a result, the coincidence detectors simultaneously produce two output signals to time comparator circuit 78.

If the harvesting machine is too far to the right relative to the row of stalks 18 (as viewed in the direction of arrow 22) then the beams 40U and 40L are interrupted simultaneously by each stalk, this interruption occurring before beams 42U and 42L are simultaneously interrupted. When beams 40U and 40L are interrupted amplifier and filter circuits 68 and 72 produce output signals to coincidence detector 76 and the coincidence detector applies a signal to time comparator 78. Subsequently, when beams 42U and 42L are interrupted amplifier and filter circuits 66 and 70 produce output signals to coincidence detector 74 and the coincidence detector applies a signal to time comparator 78. The time comparator 78 then produces a correction signal which is dependent on the interval of time between the signals from coincidence detectors 76 and 74. The correction signal is averaged by averager circuit 80 to produce a steering control signal on lead 82. The steering control signal may be applied to the steering mechanism to automatically steer the harvesting machine to the right, or it may be applied to a visual indicator to indicate to the operator that he should steer to the right. Time comparator 78 and averager circuit 80 may comprise a digital logic circuit as shown in FIG. 3.

If the harvesting machine is too far to the left relative to the row of stalks 18 (as viewed in the direction of arrow 22) then the beams 42U and 42L are interrupted simultaneously by each stalk, this interruption occurring before beams 40U and 40L are simultaneously interrupted. In this case amplifier and filter circuits 66 and 70 first produce output signals to cause coincidence detector 74 to apply a signal to time comparator 78. Subsequently, when beams 40U and 40L are interrupted, amplifier and filter circuits 68 and 72 cause coincidence detector 76 to produce an output signal to the time comparator. The time comparator determines the difference in time between the output signals from coincidence detectors 76 and 74 and produces a correction signal to averager 80 which causes the averager to produce a "right" steering control signal on lead 84.

A lower leaf, because of its angle of slant, will not interrupt beams 40U and 40L simultaneously hence the outputs from amplifier and filter circuits 68 and 72 will not be coincident and coincidence detector 76 will not produce an output signal when a leaf is encountered. In like manner, a lower leaf will not interrupt beams 42U and 42L simultaneously hence the outputs from amplifier and filter circuits 66 and 70 will not be coincident and coincidence detector 74 will not produce an output signal. Thus, the circuit of FIG. 4 in effect ignores interruptions of the energy beams by leaves but responds to interruptions of the beams by stalks to thereby provide steering control signals.

Figure 6:
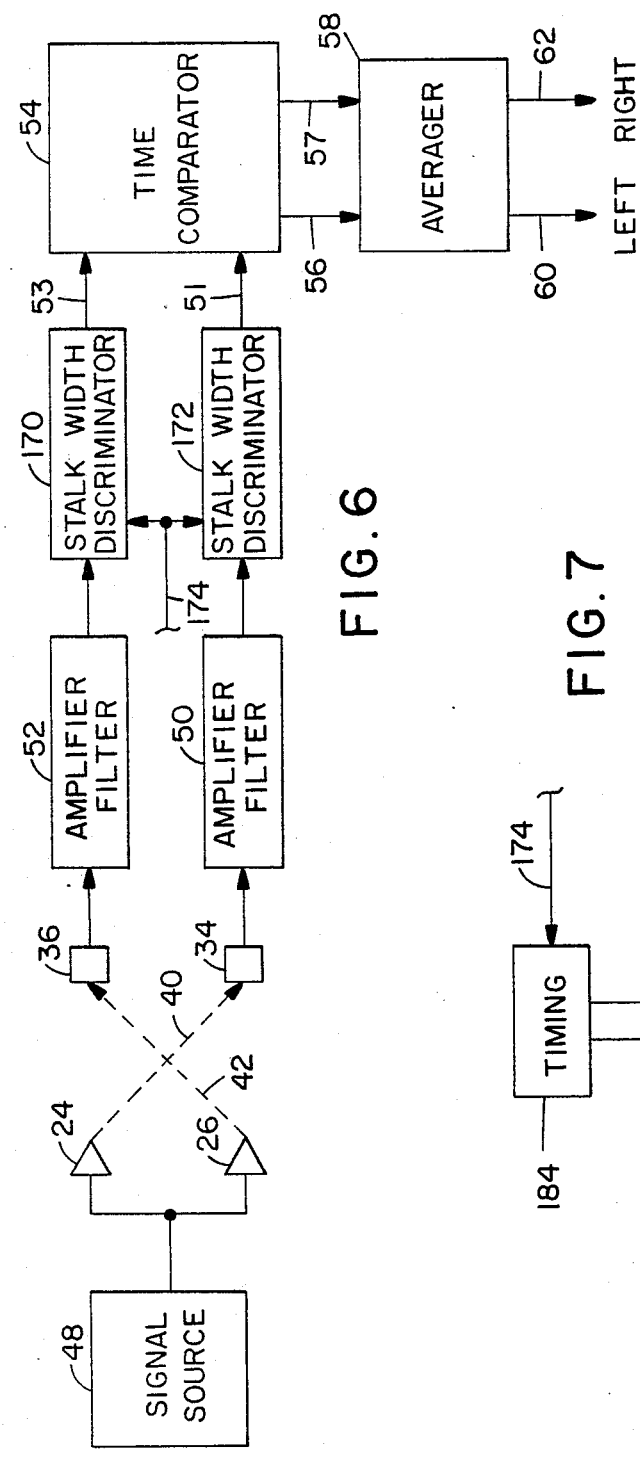
FIG. 6 is a schematic diagram of a circuit for developing steering control signals and having a discriminator for discriminating between crop stalks and weeds; and, FIG. 7 illustrates a suitable discriminator for discriminating between stalks and weeds.

If thin-stalked weeds should be present along the row of crop stalks being sensed then the circuit of FIG. 2 may respond to the weed stalks and miss some of the crop stalks thus compromising the accuracy and the response time. FIG. 6 illustrates a non-contact guidance system having discriminators for discriminating between beam receptor output signals resulting from beam interruptions caused by crop stalks and those caused by weed stalks. The guidance system of FIG. 6 differs from that shown in FIG. 2 only by the addition of a stalk width discriminator circuit for each signal applied to the time comparator 54. Weeds generally have stalks of much smaller diameter than crop stalks, such as corn. Since the time of interruption of an energy beam is related to the size of the stalk which interrupts it, and since the duration of the receptor output signal is equal to the duration of the energy beam interruption, it is possible to discriminate between crop stalks and weed stalks, and block the receptor output signal if it results from an interruption by a weed stalk. In FIG. 6, stalk width discriminators 170 and 172 are provided for discriminating between weed stalks and crop stalks. Stalk width discriminator 170 is connected between the output amplifier and filter circuit 52 and one input of time comparator 54 while stalk width discriminator 172 is connected between amplifier and filter circuit 50 and the second input to time comparator 54. Stalk width discriminator 170 operates to block from time comparator 54 signals produced by energy beam receptor 36 and resulting from interruptions of energy beam 42 by weeds or stalks of less than some preselected diameter. Inlike manner stalk width discriminator 172 operates to block from time comparator 54 signals produced by energy beam receptor 34 and resulting from interruption of energy beam 40 by weeds or stalks of less than a preselected diameter.

Figure 7:
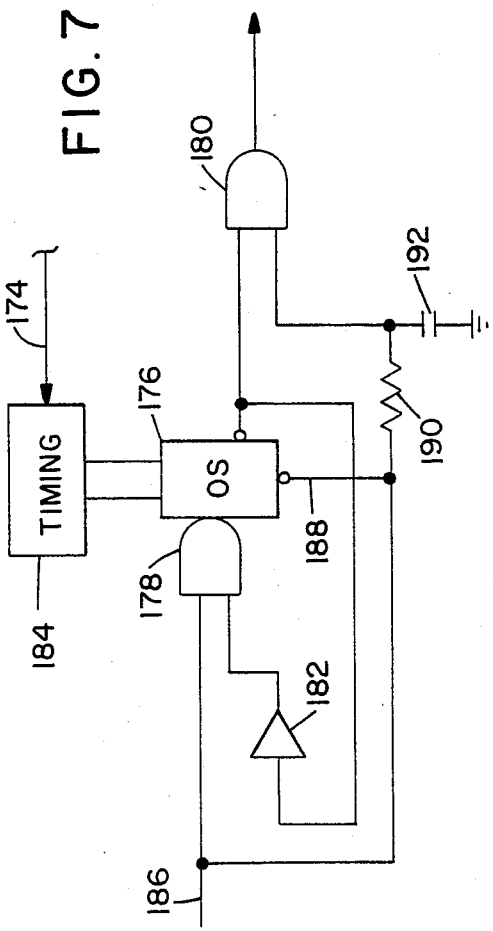

FIG. 7 illustrates a circuit suitable for use as the stalk width discriminators 170 and 172. The circuit comprises a one-shot multivibrator 176, two ANDs 178 and 180, an amplifier 182 and a timing circuit 184 for timing the duration of the output signal from OS 176 when it is triggered.

In its rest state OS 176 produces an output signal which enables one input of AND 180 and acts through amplifier 182 to enable one input of AND 178. When an energy beam is interrupted a positive-going signal appears on lead 186 having a duration equal to the time the beam is interrupted. The signal on lead 186 passes through AND 178 to immediately trigger OS 176 and block AND 180. The signal on lead 186 is delayed by the combination of resistor 190 and capacitor 192 so that the signal arrives at the input to AND 180 after OS 176 has changed and blocks the second input of the AND. If the signal on lea 186 is produced as a result of sensing a relatively small weed stalk it will end before OS 176 times out, thus blocking ANDs 178 and 180. Accordingly, no ouptut signal is produced by AND 180.

On the other hand, if the signal on lead 186 is produced as a result of sensing a relatively large crop stalk, the OS 176 times out while the signal 186 is still present. When OS 176 times out it enables AND 180 which then produces an output pulse which may be applied to time comparator 54.

The timing circuit 184 determines the duration of the output pulse from OS 176 for blocking AND 180. The timing circuit 184 may be made adjustable to provide for various crop stalk and weed stalk sizes. In a typical application, the timing circuit 184 may be adjusted so that the duration of the output pulse from OS 176 is approximately equal to the length of time that an energy beam is interrupted by a $\frac{5}{8}$" corn stalk. It will be recognized that the time of interruption of an energy beam is not only dependent on the size of the stalk causing the interruption but also dependent upon the ground speed of the harvesting machine. Therefore, a signal proportional to the harvesting machine ground speed may be applied to timing circuit 184 over a lead 174 so that the duration of the blocking pulse produced by OS 176 becomes shorter as the ground speed increases.

While preferred embodiments of the invention have been specifically described, it will be understood that various modifications and substitutions may be made in the described embodiments without departing from the spirit and scope of the invention as defined in the appended claims.

The embodiments of the invention in which an exclusive property or privilege is claimed are defined as follows:

1. A guidance system for a row crop harvesting machine having at least first and second crop row separators adapted to move along opposite sides of a crop row of stalks, said guidance system comprising:
   first and second transmitters for transmitting first and second energy beams, respectively;
   first and second energy beam receptors;
   said transmitters and receptors being mounted on said first and second row separators such that the first energy beam is received by said first receptor and said second energy beam is received by said second receptor, and said first and second energy beams having intersecting paths which cross a crop row so that said energy beams are interrupted by the stalks, the region of intersection of said energy beams defining the lateral position of said harvesting machine relative to said crop row; and,
   means responsive to said first and second receptors for producing steering control signals indicating the direction in which said harvesting machine must be steered in order to align said harvesting machine along said crop row.

2. A guidance system as claimed in claim 1 wherein said means for producing steering control signals comprises means for determining the sequence in which said energy beams are interrupted by a stalk in said crop row.

3. A guidance system as claimed in claim 1 wherein said first and second energy beams cross at a point midway between said row separators.

4. A guidance system as claimed in claim 1 wherein said energy beams are acoustic energy beams.

5. A guidance system as claimed in claim 1 wherein said energy beams are infra-red beams.

6. A guidance system as claimed in claim 1 wherein said energy beams are visible light beams 7. A guidance system as claimed in claim 1 wherein said energy beams are modulated; and means for applying a modulated signal to each of said transmitters.

8. A guidance system as claimed in claim 2 wherein said means for determining the sequence in which said energy beams are interrupted comprises:
   a first flip-flop responsive to said first energy beam receptor for storing an indication when said first energy beam is interrupted by a given stalk;
   a second flip-flop responsive to said second energy beam receptor for storing an indication when said second energy beam is interrupted by said given stalk;
   means responsive to said first and second flip-flop for initiating and timing a dead zone interval;
   third and fourth flip-flops connected to said first and second flip-flops, respectively, and to said means for initiating and timing a dead zone interval, said means for initiating and timing a dead zone interval producing an output signal which clocks the indications stored in said first and second flip-flops into said third and fourth flip-flops, respectively, at the end of said dead zone interval.

9. A guidance system as claimed in claim 8 wherein said means for producing steering control signals includes:

an up-down counter; and, logic circuit means including first means responsive to said third and fourth flip-flops for incrementing said counter when said first flip-flop but not said second flip-flop is set before the end of said dead zone interval, said logic circuit means including second means responsive to said third and fourth flip-flops for decrementing said counter when said second flip-flop but not said first flip-flop is set before the end of said dead zone interval.

10. A guidance system as claimed in claim 9 wherein said means for producing steering control signals includes a decoder means for producing a first steering control signal when said counter contains a count greater than a first value and a second steering control signal when said counter contains a count less than a second value.

11. A guidance system as claimed in claim 10 and further comprising means for resetting said counter to an intermediate value which is less than said first value and greater than said second value, said logic circuit means including third means responsive to said third and fourth flip-flops for incrementing said counter when said counter contains a count less than said intermediate value and both said first and second flip-flops are set during said dead zone interval and fourth means responsive to said third and fourth flip-flops for decrementing said counter when said counter contains a count greater than said intermediate value and both said first and second flip-flops are set during said dead zone interval.

12. A guidance system as claimed in claim 11 and further comprising first and second indicators responsive to said first and second steering control signals, respectively.

13. A guidance system as claimed in claim 12 and further comprising a third indicator for indicating to an operator that he is steering along a row, said decoder means including means for energizing said third indicator when the count in said counter is equal to or less than said first value and equal to or greater than said second value.

14. A guidance system as claimed in claim 1 and further comprising:

third and fourth transmitters for transmitting third and fourth energy beams, respectively;

third and fourth energy beam receptors;

said third and fourth transmitters and receptors being mounted on said first and second row separators above said first and second transmitters and receptors, said third and fourth transmitters and receptors being mounted such that said third energy beam is received by said third receptor and said fourth energy beam is received by said fourth receptor, said third and fourth energy beams having intersecting paths with the point of intersection being in a vertical line above the point at which said first and second energy beams intersect;

said means for producing steering control signals including means responsive to said third and fourth receptors as well as said first and second receptors for producing said steering control signals.

15. A guidance system as claimed in claim 14 wherein said means for producing steering control signals includes first and second coincidence detection means responsive to said first and third, and said second and fourth receptors, respectively, for producing said steering control signals when said first and said third energy beams are concurrently interrupted or when said second and fourth energy beams are concurrently interrupted.

16. A guidance system as claimed in claim 14 wherein said means for producing steering control signals includes means responsive to said first and second coincidence detection means for producing a first steering control signal when first and third energy beams are interrupted before said second and fourth energy beams and producing a second steering control signal when said second and fourth energy beams are interrupted before said first and second energy beams.

17. A guidance system as claimed in claim 16 and further comprising an averager circuit responsive to said first and second steering control signals for averaging said first and second steering control signals.

18. A guidance system as claimed in claim 17 and further comprising indicator means responsive to said averager circuit.

19. A guidance system as claimed in claim 1 and further comprising stalk width discriminator means connected between each of said receptors and said means for producing steering control signals.

20. A guidance system as claimed in claim 19 wherein each said stalk width discriminator means includes a one-shot multivibrator responsive to a receptor for producing a pulse output, logic circuit means responsive to a receptor and said pulse for applying a signal to said means for producing steering control signals; and means for varying the duration of said pulse in accordance with the ground speed of said harvesting machine.

* * * * *